July 22, 1969     R. N. MASSEY     3,456,818
GRAIN AUGER APPARATUS
Filed Nov. 29, 1967     4 Sheets-Sheet 1
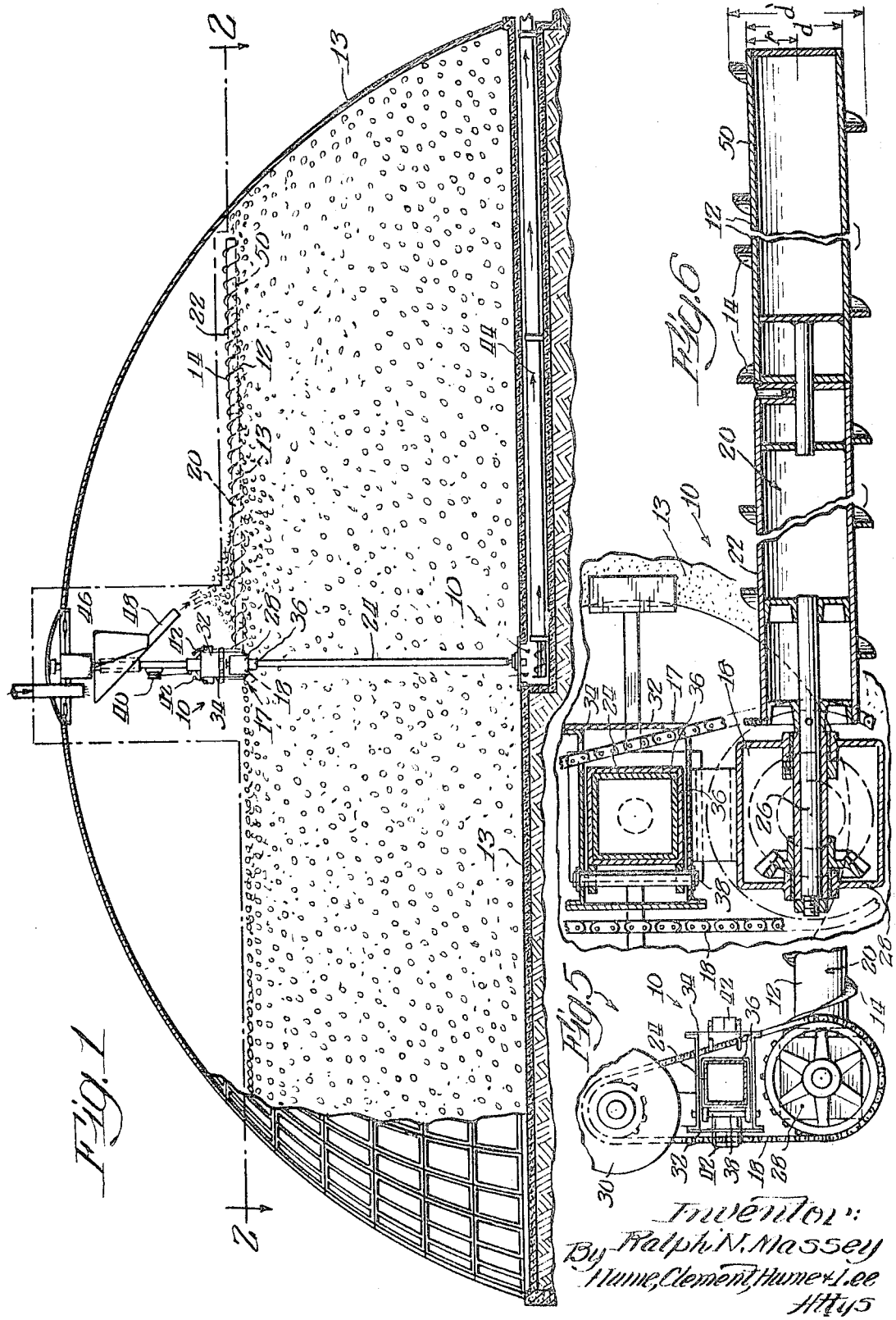
Inventor:
Ralph N. Massey
By Hume, Clement, Hume & Lee
Attys

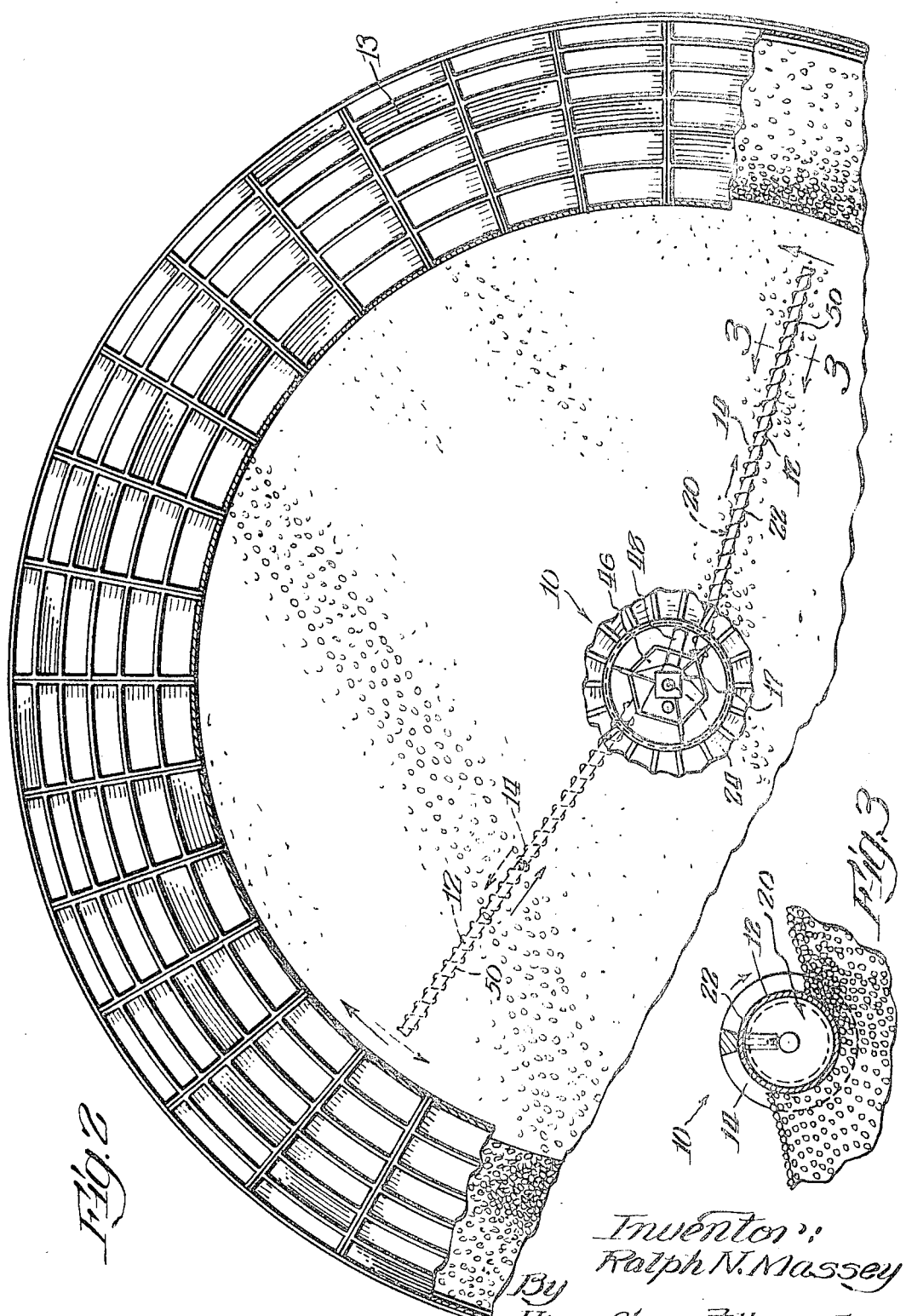

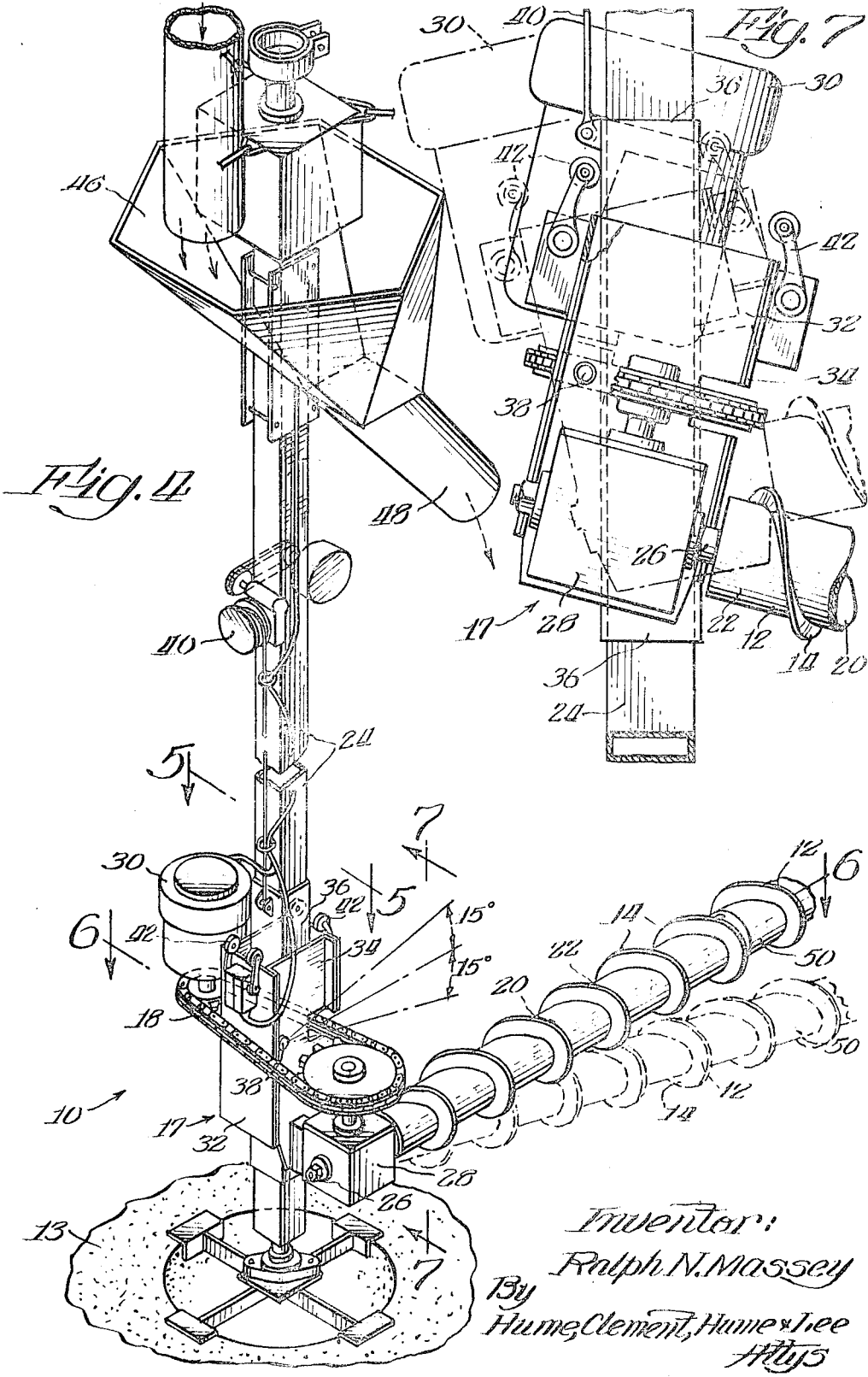

July 22, 1969 R. N. MASSEY 3,456,818
GRAIN AUGER APPARATUS
Filed Nov. 29, 1967 4 Sheets-Sheet 4
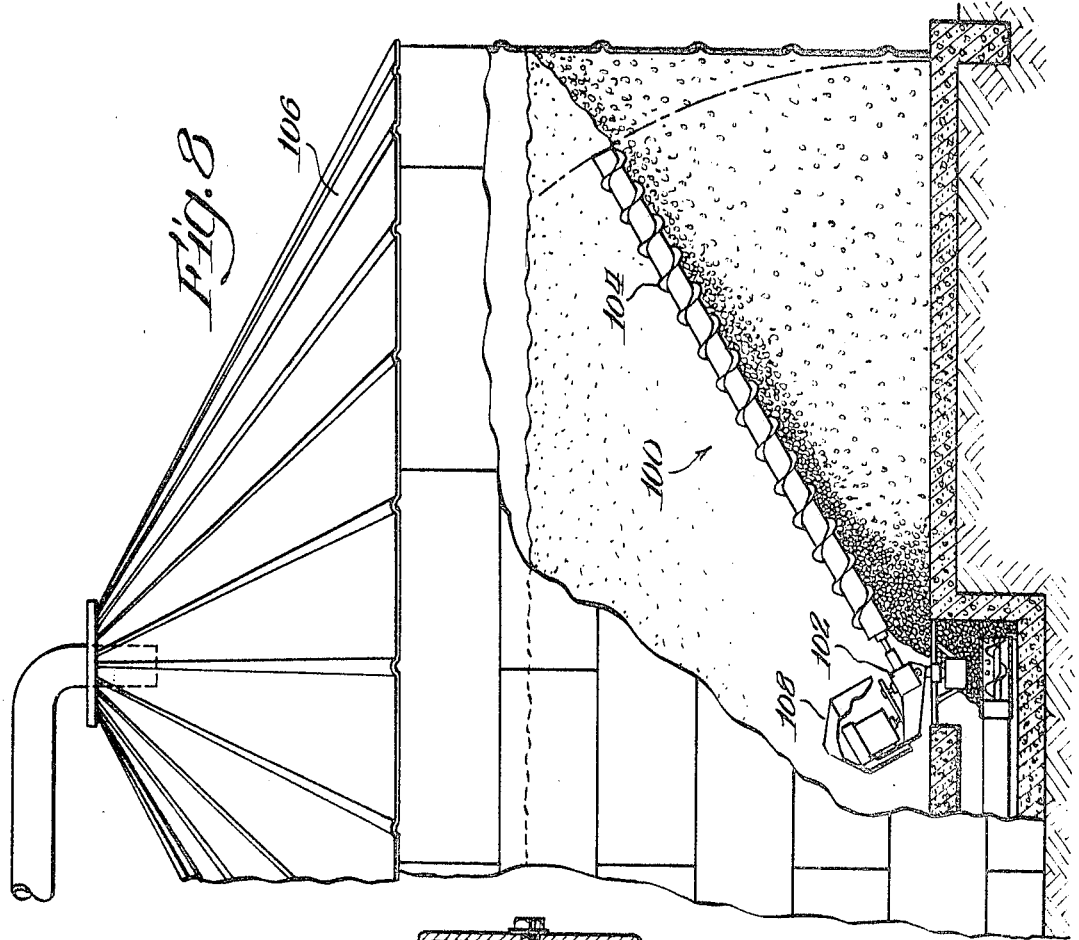
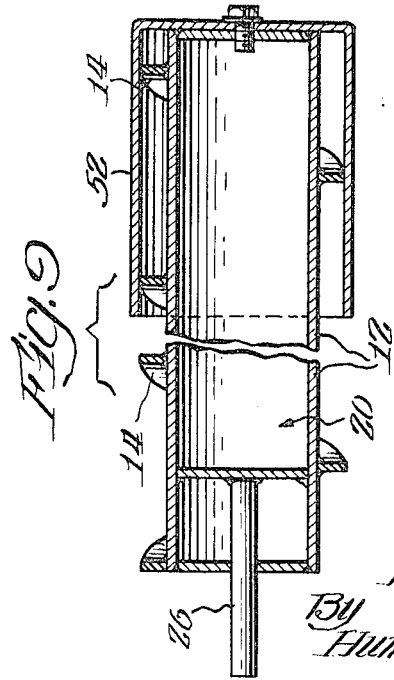
Inventor:
Ralph N. Massey
By Hume, Clement, Hume & Lee
Attys United States Patent Office 3,456,818
Patented July 22, 1969

3,456,818
GRAIN AUGER APPARATUS
Ralph N. Massey, Ensign, Kans., assignor to Speed King Manufacturing Company, Inc., Dodge City, Kans., a corporation of Kansas
Filed Nov. 29, 1967, Ser. No. 686,570
Int. Cl. B65g 65/30, 33/10
U.S. Cl. 214—17  13 Claims

ABSTRACT OF THE DISCLOSURE

An auger for distributing free-flowing particulate materials in depth within a storage bin, where the auger is self-floating on the material by means of an elongate floatation chamber in the auger providing distributed displacement of a weight of material greater than the weight of the auger. The auger is preferably supported and axially solely at its inner end and is freely horizontally rotatable and vertically pivotable to move over the upper surface of the material.

Introduction

The present invention relates to systems for leveling or distributing free-flowing materials in depth within storage means, and in particular to a self-floating auger therefor.

With increasing dimensions of material storage bins, the automatic inloading and outloading of these bins has become an increasingly critical problem. For example, grain will flow by gravity only if the slope of the grain exceeds its natural angle of repose which may be as high as 45 degrees. Thus, distribution of the grain evenly within the bin is essential for efficient filling of the bin and for clean-out of the bin during unloading.

The apparatus disclosed herein is particularly suitable for effecting efficient inloading and/or outloading of grain or other particulate materials from storage bins. The apparatus is simple, efficient and avoids many of the problems of prior units. Prior auger systems, for example, tended to dig in or bury the auger in the grain and become ineffectual unless the auger was supported by complicated supporting and position adjusting mechanisms.

The auger system of the invention provides efficient and rapid automatic loading and unloading of bins of varying sizes and shapes. It automatically adjusts to the material surface as that surface changes during loading or unloading. It provides a continuous self-rotating sweeping of the material surface and leveling of the material in the bin. Only a preselected portion of the auger is submerged, automatically controlling the material movement rate and the speed.

The distribution system of the invention preferably includes an elongated auger in the material bin having a material transporting flight thereon. The auger is horizontally rotatable and has an elongated floatation portion which provides self-floatation of the auger by displacement of the material. The auger has a weight less than the weight of the displaced material and is thereby unsupportedly self-floating at the surface of the material.

Further objects, features and advantages of the invention pertain to the particular arrangement and structure whereby the above mentioned aspects of the invention are attained. The invention will be better understood by reference to the following description and to the drawings forming a part thereof, which are substantially to scale, wherein:

FIGURE 1 is a plan view partially in central cross-section of one exemplary embodiment of the invention;

FIGURE 2 is a cross-sectional view taken along the line 2—2 of FIGURE 1;

FIGURE 3 is a partial cross-sectional view taken along the line 3—3 of FIGURE 2;

FIGURE 4 is a perspective view of the auger system of FIGURE 1;

FIGURE 5 is a cross-sectional view taken along the line 5—5 of FIGURE 4;

FIGURE 6 is a cross-sectional view taken along the line 6—6 of FIGURE 4;

FIGURE 7 is a cross-sectional view taken along the line 7—7 of FIGURE 4;

FIGURE 8 is a plan view partially in central cross-section of another embodiment of the invention; and FIGURE 9 shows another embodiment of the auger of FIGURE 1 et al.

Description of the exemplary embodiments

Referring first to FIGURES 1 through 7, there is shown therein a distribution system 10 in accordance with the present invention for moving free-flowing particulate material in depth within a storage area. The system 10 here includes an elongated auger 12 floating and rotating in a hemispherical grain bin 13 and distributing the grain horizontally during inloading or outloading of the bin 13. The auger 12 has a central floatation portion and a transport portion comprising a material transporting flight 14. The auger is secured solely at its inner end to a pivot 17 centrally disposed in the bin 13 and is horizontally rotatable about the pivot 17. An auger drive 18 is provided to axially rotatably drive the auger 12, thereby axially transporting the grain and also causing the auger 12 to horizontally rotate over the upper grain surface. The floatation portion is preferably an integral floatation chamber 20 substantially coextensive in length with the auger 12 and is formed by a closed cylindrical center tube 22. The floatation chamber 20 provides self-floatation of the auger only partially submerged on the grain surface by displacing a weight per unit length of the grain greater than the weight per unit length of the auger. The volume of grain displaced is the volume of the portion of the tube 22 which is below the surface of the grain.

In referring to the horizontal rotation of the auger in the bin about the pivot, it will be understood that this refers to the rotational sweeping of the auger over the grain surface about a generally vertical axis and that this does not mean that the auger itself is necessarily horizontal. The auger is also preferably vertically pivotable about its inner end, and the longitudinal axis of the auger may incline substantially above or below the horizontal to adjust to the slope of the grain in the bin.

Considering in detail the auger 12, it will be noted that the auger 12 is operable without the aid of any elaborate suspension systems or guide tracks. In the distribution system 10, only the inner end of the auger is rotatably secured to a center pole 24 which is part of the pivot 17. The auger 12 is vertically slidable on the center pole 24 so that it may be raised or lowered as grain is added or removed. The length of the auger floatation tube 22 may be many times its diameter, yet it is not supported anywhere along its longitudinal axis. The length of the auger may therefore be easily varied to match the particular radius of the bin 13. The diameter of the tube 22 controls the displacement of grain, and therefore the preset diameter of the tube 22 will depend upon both the weight of the auger and the density of the grain or other material.

Suitable construction for the auger 12 includes a thin walled cylindrical seamless steel or aluminum tube closed at each end to exclude grain to form the tube 22. Fourteen gauge metal is an appropriate tube wall thickness. The auger flight 14 may be a simple helical blade which fastens around the exterior of the tube 22. Suitable flights may be obtained, for example, from Thomas Screw Conveyor Company. The flight may be welded directly to the exterior of the tube 22. The flight is preferably uninterrupted so as to prevent ridges or unevenness in the grain distribution. Both the central tube 22 and the flight 14 preferably extend the full longitudinal axis of the auger 12. Accordingly, there is even displacement and floatation along the entire axial length of the auger.

Considering the floatation chamber 20, it may be seen that to provide the desired floatation the tube 22 is substantially larger than the conventional center shaft of an auger. It has been found that a ratio of overall diameter, i.e. the diameter of the projecting flight 14 ($d'$ in FIGURE 6) to the diameter of the tube 22 ($d$ in FIGURE 6) is preferably substantially within range of 1:3 to 4:5 for efficient grain distribution. Preferably, the radius of the floatation chamber 20 defined by the tube 22 conforms to the formula $W<\Pi r^2 D$, where W is the weight per unit length of the auger, $r$ is the radius of the tube 22, and D is the density or weight per unit volume of the grain. The extent to which W is less than $\Pi r^2 D$ will determine the depth of submergence of the auger in the grain. Although the auger will operate from a very slight submergence to an almost total submergence in the grain, a submergence of more than ¾ of the tube 22 diameter is not desirable as it causes a much slower and less effective horizontal self-rotation due to the increased drag of the auger through the material. The elongate nature of the tube 22 and the fact that a substantial portion of the tube 22 is normally above the grain surface result in very little drag normally and thus allow an effective self-sweeping system wherein the auger rotates horizontally over the surface of the grain solely due to the axial rotary drive without requiring a separate horizontal rotary drive.

Considering the pivot 17, this may be particularly seen in FIGURE 4 and the cross-sections of FIGURES 5 through 7. The auger 12 is connected only to the pivot 17 and only at the inner end of the auger. The auger is axially rotatably driven through the same connection by the auger drive 18. A drive shaft 26 extends axially from the inner end of the auger 12 into a gearbox 28 to connect the auger to the pivot 17. The gearbox 28 transfers power from an electric drive motor 30 into axial rotation of the auger 12. Both the gearbox 28 and the motor 30 are mounted to a box frame 34, and all three units form a pivot assembly 32. The box frame 34 encloses, but is spaced from, the noncircular center pole 24. This spacing allows vertical tilting by the entire pivot assembly 32 and the connected auger. This is accomplished by connection of the pivotal assembly 32 to a tubular slide 36 by a pin 38. The slide 36 is inside the box frame 34 and closely slidably surrounds the center pole 24. The horizontal pin 38, shown particularly in FIGURES 4 and 7, provides limited relative movement about a horizontal axis of the pivot assembly 32. The dotted outlines in FIGURE 7 show varying positions of the pivot assembly 32.

Preferably, in the distribution system 10 means are provided for vertically raising or lowering the entire auger 12 as the bin is filled or emptied respectively. This is accomplished here by slidably raising or lowering the pivot assembly 32 on the center pole 24 by an electric motor driven reel 40 fixed to the upper part of the center pole 24. The cable of the reel 40 is connected to the pivot assembly 32, and operating the reel motor 40 raises or lowers the pivot assembly.

Preferably, the reel 40 is fully automatically controlled. This is accomplished here by switches 42 on the pivot assembly 32, which switches 42 control the operation of the reel motor. As may be clearly seen in FIGURE 7, when the pivot assembly 32 has tilted to a desired preset angle the operating levers of one of the switches 42 will be actuated by contact with the center pole 24 and will thereby operate the reel 40. The switches 42 are provided at opposite sides of the center pole 24 to limit the maximum angular displacement of the auger 12 above and below the horizontal. Parallel back-up switches are preferably provided, as shown.

Horizontal rotation of the auger 12 is provided in the distribution system 10 by mounting the center pole 24 with rotational bearings at its top and bottom. This allows the center pole 24 and the entire pivot assembly 32 including the auger 12 to rotate about the vertical axis defined by the center pole 24.

Considering the means for inloading and outloading the bin 13, these may be generally conventional. Preferably, the grain is inloaded through a central opening at the top of the bin and outloaded through a central opening at the bottom or lower surface of the bin where the grain may be removed by a conventional screw auger 44. Preferably, a hopper 46 is mounted to and rotates with the center pole 24 adjacent the inlet to the bin 13. Grain entering the bin enters the hopper 46 regardless of the position of the auger 12 and is discharged through a hopper discharge tube 48. This discharge tube 48 is positioned to continuously place the grain near the inner end of the anger 12 as the auger horizontally rotates around the bin. This also provides even circumferential distribution of the grain so that all sides of the bin are filled evenly by the auger 12.

The operation of the distribution system 10 is fully automatic. Assuming that the system is being used for distributing grain during the inloading of the bin 13, as previously stated the grain would normally be loaded in through the top of the bin 13 and initially distributed by the hopper 46. The auger 12 is driven solely by the auger drive 18. The axial rotation of the flight 14 transports the grain outwardly from the inner end of the auger 12 toward its outer end. Since the length of the auger 12 is preferably a substantial portion of the radius of the bin 13, the grain is thus transported outwardly to the sides of the bin to completely fill the bin. The upper surface of the grain in the bin is maintained in a level state by the auger throughout the inloading operation. Any irregularities in the grain surface are automatically leveled. If, for example, grain is piled above the general grain surface at one point, as the auger 12 sweeps into this pile the flight 14 becomes more fully immersed in the grain within the pile than in the remainder of the grain surface. In fact, the auger may float upwardly somewhat. Thus, a larger volume of grain is transported from the region of the pile, thereby leveling the surface. The inloading rate of the grain is not critical; however, preferably, this rate is matched to the grain transport speed of the auger 12 to avoid creating a ridge of material at the outer end of the auger.

The auger 12 actually floats like a ship on the surface of the grain, and if it is initially submerged it will rise to the surface during its operation. Its floatation and its free vertical pivotal connection to the pivot 71 allow the auger to continually adjust its height automatically to the contours of the grain surface. Thus, the auger remains at the desired level of partial submergence in the grain surafce at all times. FIGURE 3 shows a cross-sectional view of the auger during its operation in the grain surface.

In addition to exerting an outward radial force on the grain with which it comes in contact, the flight 14 exerts a lateral force on the grain surface which causes an equivalent lateral counterforce on the auger 12. This force is sufficient in the system 10 to cause the auger 12 to rotate horizontally at a substantially constant speed about the pivot 17. The rotating force is substantial and quite constant due largely to the fact that the distributed self-flotation of the auger allows only the lower portion of the flight 14 and the flotation tube 22 to be immersed in the grain, thereby providing a unidirectional force and a minimum drag. The horizontal rotational speed of the auger is a function of the axial rotational speed of the auger and the bite of the flight minus the resistance or drag of the auger through the material. The drag is a function of the auger diameter and the degree of its submergence in the material.

It will be appreciated that the distribution of flotation along the auger allows the auger to have a relatively small diameter and therefore minimum drag, yet complete self-flotation. Attempting to provide flotation by wheels, skids, etc., at the outer end of the auger is not practical or effective. The high drag which such devices would exert due to their size and their position at the end of the lever arm formed by the auger would prevent the auger from being horizontally self-rotating. A separate rotary horizontal drive would be required for the auger. Further, the position of the auger would then be responsive only to the level of the grain at the very outer end of the auger, thus providing much less effective self-leveling and depth control for the auger.

As the bin 13 is filled, the auger 12 will tilt upwardly from the horizontal due to the raising of the upper grain surface and the consequent upward floatation of the auger. At any desired preset angle of tilt the switches 42 may be set to operate and lift the pivot assembly 32 upwardly on the center pole 24, thereby lifting the inner end of the auger 12. This occurs repeatedly as the bin is filled to maintain the auger 12 in a generally horizontal position. The auger drive 18 may be shut off manually or automatically when the bin is filled. Loading of the uppermost portion of the bin may be by gravity only.

Considering the operation of the distribution system 10 in the outloading of the bin 13, the operation is generally similar to inloading except that of course the operation of the auger drive 18 is reversed so that the auger rotates in the opposite direction to transport material inwardly toward the center of the bin. Grain may be first unloaded by gravity through the screw auger 44 at the base of the bin until the natural angle of repose of the grain is reached. Then the distribution system 10 may be actuated for the clean-out of the bin. The remaining grain is pulled inwardly toward the center of the bin by the auger and removed. As the level of the grain drops, the auger floating thereon will drop correspondingly and the switches 42 will be actuated to control the reel 40 and to lower the vertical position of the auger. If desired, a device such as a small wheel may be placed on the end of the auger to protect the auger from scraping against the bottom of the bin as the auger approaches the bottom.

For more complete automatic clean-out in a bin where the radius of the bin wheel varies, such as the bin 13, an elongate removable coaxial auger extension 50 as shown in FIGURE 6 may be readily applied to the end of the auger 12 to extend its effective length. The auger extension 50 corresponds in structure and function to the main portion of the auger 12 and cooperates therewith. Readily varying the length of the auger without changing the effectiveness of its operation is possible in view of the absence of auger supports and the distribution of self-floatation along both the auger 12 and the auger extension 50.

A further feature which may be provided for the auger 12 is illustrated in FIGURE 9. This feature comprises means for creating an effectively flightless minor axial and portion on the auger to assist in the distribution of and smoothing the distribution of the grain at the outer end of the auger. Various apparatus may be provided. The apparatus shown in FIGURE 9 comprises a cylindrical sleeve 52 enclosing a portion of the outer end of the auger. The sleeve 52 tends to flatten out the ridge of material that may form at the end of the auger during its operation. The end of the effective flight 14 just before the sleeve 52 pushes the grain under the sleeve. Then, the sleeve 52 levels this grain and pushes it radially outward toward the wall of the bin. The sleeve may also raise somewhat the outer end of the auger to provide a slight taper in the submergence of the auger in the grain, thereby reducing the amount of grain transported to the outer end of the auger and increasing the amount distributed at intermediate portions of the auger. The sleeve 52 may be axially slotted or may have other suitable configurations.

Considering the embodiment of FIGURE 8, the distribution system 100 therein is basically similar in structure and operation to the distribution system 10. The principal distinction is that the pivot 102 therein restrains the innner end of the auger 104 at the lower surface of the bin 106. There is no center pole, and the auger 104 does not move vertically other than by tilting vertically about the pivot 102. The operation of the auger 104 may be basically identical in its floatation and horizontal self-rotation. The procedure for inloading and outloading the bin 106 differs somewhat however. In inloading, the distribution system 100 is operated until the auger 104 has piled up the incoming material against the walls of the bin 106 up to the natural angle of repose of the material. The distribution system 100 is then stopped, and the bin 106 is filled to the remainder of its capacity simply by gravity loading of the material into the top of the bin. Correspondingly, during outloading the material is removed by gravity flow until the angle of repose is reached whereupon the distribution system 100 is actuated for clean-out of the remainder of the material. The motor 108 for driving the auger 104 may be enclosed for its protection during its submergence in the material.

The apparatus described herein is presently considered to be preferred; however, it is contemplated that further variations and modifications within the purview of those skilled in the art can be made herein.

What is claimed is:

1. A distribution system comprising:
   a storage chamber for retaining particulate materials in substantial depth, wherein the materials are of a predetermined weight per unit volume,
   a pivot centrally disposed in said storage chamber,
   an elongated auger connected to said pivot for free rotation about said pivot substantially in a horizontal plane,
   said auger having a longitudinal axis and being rotatable about that axis for moving the particulate materials,
   said auger including a transport portion and a floatation portion,
   said transport portion being made up of a helical flight extending along said longitudinal axis,
   said floatation portion being distributed along the length of said longitudinal axis with said transport portion,
   said transport portion and floatation portion defining a predetermined material displacement volume per unit length of said longitudinal axis,
   the weight of said transport portion and said floatation portion per unit length of said longitudinal axis being less than the weight of a volume of the material corresponding to said displacement volume so that said auger is self-floating in said material,
   driving means connected to said auger for rotation of said auger about said longitudinal axis,
   whereby upon operation of said driving means said auger is rotated about said longitudinal axis in floatation on the upper surface of the particulate material, and said auger moves said particulate material in a direction along said longitudinal axis, and said auger is moved in an arcuate path about said pivot.

2. The distribution system of claim 1 wherein said elongate auger is secured solely to said pivot and wherein said auger is vertically self-pivotable about said pivot.

3. The distribution system of claim 1 wherein said storage chamber has a lower surface and wherein one end of said auger is secured from vertical movement adjacent said lower surface.

4. The auger system of claim 1 wherein said pivot includes a vertical column centrally disposed in said storage means and wherein said pivot includes means for vertical movement of said entire auger relative said column.

5. The auger system of claim 1 wherein said pivot includes a vertical column rotatably mounted in said storage chamber and wherein the inner end of said auger is secured to said column for rotation about a common vertical axis and is vertically slidable on said column.

6. An open elongate auger for moving free-flowing particulate materials arranged in piles of substantial depth wherein the materials are of a predetermined weight per unit volume, said auger having a longitudinal axis and being rotatable about that axis, said auger including a transport portion and a floatation portion, said transport portion being made up of a helical flight arranged concentrically with said longitudinal axis for moving the materials, said floatation portion being distributed along the length of said longitudinal axis with said transport portion, said transport portion and floatation portion defining a predetermined material displacement volume per unit length of said longitudinal axis, the weight of said transport portion and said floatation portion per unit length of said longitudinal axis being less than the weight of a volume of the material corresponding to said displacement volume so that said auger is self-floating in said material.

7. The auger of claim 6 wherein said floatation portion is a cylindrical floatation chamber substantially coextensive and concentric with said longitudinal axis of said auger and wherein said transport position is exterior to said floatation portion.

8. The auger of claim 6 wherein said floatation portion is formed by a thin walled cylindrical closed floatation tube and wherein said flight is secured to and projects from the exterior of said tube.

9. The auger of claim 6 wherein said auger has a removable elongated auger extension extending axially from the outer end thereof.

10. The auger of claim 6 wherein a minor axial portion of said auger at the outer end thereof is effectively flightless for smoothing the distribution of said materials adjacent the outer end of said auger.

11. The auger of claim 7 wherein W is less than $\Pi r^2 D$, where W is the weight per unit length of said auger, $r$ is the radius of said floatation chamber, and $D$ is the weight per unit volume of said material.

12. The auger of claim 8 wherein the ratio of the diameter of said floatation tube to the overall diameter of said auger is substantially within 1:3 to 4:5.

13. The auger of claim 10 wherein said effectively flightless end portion comprises a generally cylindrical sleeve enclosing at least a portion of the outer end of the auger.

References Cited

UNITED STATES PATENTS 2,711,814   6/1955   McCarthy.
3,123,234   3/1964   Bjerkan.
3,134,491   5/1964   Glenn et al.

ROBERT G. SHERIDAN, Primary Examiner

U.S. Cl. X.R.

198—213

PO-1050
(5/69)

UNITED STATES PATENT OFFICE
CERTIFICATE OF CORRECTION

Patent No. 3,456,818   Dated July 22, 1969

Inventor(s) R. N. Massey

It is certified that error appears in the above-identified patent and that said Letters Patent are hereby corrected as shown below:

Column 1, line 19, after "axially" insert --driven--

Column 3, line 4, change "flight" to --flighting--

Column 4, line 72, change "flotation" to --floatation-- line 73, change "flotation" to --floatation--

Column 5, line 5, change "flotation" to --floatation-- line 8, change "self-flotation" to --self-floatation-- line 8, change "flotation" to --floatation--

Column 6, line 6, change "conflgurations" to --configurations-- line 10, change "innner" to --inner--

SIGNED AND
SEALED
MAR 3 1 1970

(SEAL)
Attest:

Edward M. Fletcher, Jr.
Attesting Officer

WILLIAM E. SCHUYLER, JR.
Commissioner of Patents